US010293556B2

(12) United States Patent
Taniuchi

(10) Patent No.: US 10,293,556 B2
(45) Date of Patent: May 21, 2019

(54) THREE DIMENSIONAL OBJECT MODELING APPARATUS, PRINTING APPARATUS, THREE DIMENSIONAL OBJECT MODELING METHOD, TRANSFERRING PRESSING MEMBER, AND TRANSFER BODY

(71) Applicant: CANON KABUSHIKI KAISHA, Tokyo (JP)

(72) Inventor: Hiroshi Taniuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 650 days.

(21) Appl. No.: 14/790,230

(22) Filed: Jul. 2, 2015

(65) Prior Publication Data

US 2016/0001534 A1 Jan. 7, 2016

(30) Foreign Application Priority Data

Jul. 3, 2014 (JP) ................................ 2014-137900

(51) Int. Cl.
*B32B 37/00* (2006.01)
*B29C 67/00* (2017.01)
(Continued)

(52) U.S. Cl.
CPC ........ *B29C 67/0085* (2013.01); *B29C 64/165* (2017.08); *B29C 64/20* (2017.08);
(Continued)

(58) Field of Classification Search
CPC ... B32B 37/00; B32B 37/004; B32B 37/0046; B32B 37/02; B32B 37/025; B32B 37/20;
(Continued)

(56) References Cited

U.S. PATENT DOCUMENTS 6,245,249 B1 6/2001 Yamada et al.
6,557,607 B2 5/2003 Yamada et al.
(Continued)

FOREIGN PATENT DOCUMENTS

JP H04-70785 A 3/1992
JP H06-155725 A 6/1994
(Continued)

OTHER PUBLICATIONS

Japanese Office Action issued in corresponding Japanese Application No. 2015-131547 dated Nov. 13, 2018.

*Primary Examiner* — Jacob T Minskey
*Assistant Examiner* — Matthew Hoover
(74) *Attorney, Agent, or Firm* — Venable LLP

(57) ABSTRACT

A three dimensional object modeling apparatus that produces a three dimensional object. The apparatus including a forming unit configured to form a transfer image to be transferred on an intermediate transfer body, with the transfer image to be transferred to a laminate product that is a three dimensional object being formed. A laminating unit is provided to transfer the transfer image to the laminate product from the intermediate transfer body, and a pressing member is provided with the intermediate transfer body to take pressing power to the transfer image formed on the intermediate transfer body, in a state of contacting with the laminate product from the intermediate transfer body side for transferring the image to the laminate product. The pressing member including a plurality of high hardness portions having a high hardness and a low hardness portion having a hardness lower than that of the high hardness portions.

8 Claims, 6 Drawing Sheets

(51) Int. Cl.

| | |
|---|---|
| ***B29C 64/165*** | (2017.01) |
| ***B29C 64/20*** | (2017.01) |
| *B33Y 10/00* | (2015.01) |
| *B33Y 30/00* | (2015.01) |
| *B33Y 40/00* | (2015.01) |
| *B29K 105/00* | (2006.01) |
| *B29K 23/00* | (2006.01) |

(52) U.S. Cl.
CPC .... *B29K 2023/12* (2013.01); *B29K 2105/251* (2013.01); *B33Y 10/00* (2014.12); *B33Y 30/00* (2014.12); *B33Y 40/00* (2014.12)

(58) Field of Classification Search
CPC ....... B32B 37/26; B29C 67/00; B29C 67/005; B29C 67/0059; B29C 67/007; B29C 67/0074; B29C 67/009; B29C 67/0092; B29C 67/008; B29C 67/008; B29C 67/0085; B29C 67/0081
See application file for complete search history.

(56) References Cited

U.S. PATENT DOCUMENTS

| | | | | |
|---|---|---|---|---|
| 2001/0023010 | A1 | 9/2001 | Yamada et al. | |
| 2007/0065595 | A1 | 3/2007 | Yamada et al. | |
| 2008/0069610 | A1* | 3/2008 | Nakafuji | G03G 15/24 399/329 |
| 2013/0100216 | A1* | 4/2013 | Ohnishi | B41J 2/0057 347/102 |

FOREIGN PATENT DOCUMENTS

| | | | |
|---|---|---|---|
| JP | H10-305488 | A | 11/1998 |
| JP | 11-249461 | A | 9/1999 |
| JP | 2008030786 | A | 2/2008 |

* cited by examiner

THREE DIMENSIONAL OBJECT MODELING APPARATUS, PRINTING APPARATUS, THREE DIMENSIONAL OBJECT MODELING METHOD, TRANSFERRING PRESSING MEMBER, AND TRANSFER BODY

BACKGROUND OF THE INVENTION

Field of the Invention

The present invention relates to a three dimensional object modeling apparatus, a printing apparatus, a three dimensional object modeling method, a transferring pressing member, and a transfer body and, more particularly, to a transfer technique in three dimensional object modeling by a transfer lamination system.

Description of the Related Art

Japanese Patent Laid-Open No. H10-305488(1998) discloses a transfer laminate system as one system in three dimensional object modeling. The transfer laminate system disclosed in this literature adjusts a joining force between a pattern layer to be transferred and a substrate having the pattern layer formed thereon and a joining force between the pattern layer and a member, to and on which the pattern layer separated from the substrate is joined and laminated, thereby separating and joining the pattern layer so as to transfer the pattern layer. However, in order to reduce a transfer pressure that causes degradation of transfer accuracy so as to achieve highly accurate transferring, a difference between the two joining forces need be increased in this transfer system, thus possibly restricting the design freedom of a configuration for transferring.

On the other hand, Japanese Patent Laid-Open No. H06-155725(1994) discloses a technique for transferring per se in which rubbing is generated between an ink image to be transferred and a drum holding the ink image thereon so as to enhance transferability of the ink image. Specifically, in a case where a pressing roller brings a print sheet into press-contact with an ink image formed on a drum, followed by transferring, and the pressing roller deforms the drum under pressure, thereby producing force in a shear direction between the drum and the ink image so as to facilitate the separation of the ink image. Japanese Patent Laid-Open No. H04-70785(1992) discloses a similar technique for making a speed difference between two rollers holding a transfer product therebetween so as to generate rubbing (force in a shear direction).

The transferring techniques disclosed in Japanese Patent Laid-Open No. H06-155725(1994) and No. H04-70785 (1992) enable the rubbing or shear force to be generated between a transfer image and a member holding the same thereon so as to easily separate the transfer image from the member holding the same thereon, and thus, enhance transferring efficiency.

However, the transferring techniques disclosed in Japanese Patent Laid-Open No. H06-155725(1994) and No. H04-70785(1992) basically pressurize and deform the transfer image (a transfer layer) at only one point, wherein the deformation point is moved on the transfer image in a roller rotational direction, so that the transfer image is separated. Consequently, the transfer image extends in the movement direction of the point, thereby possibly raising drawbacks such as the generation of the distortion of the image per se and the non-uniformity of the thickness of the transfer image.

SUMMARY OF THE INVENTION

An object of the present invention is to provide a three dimensional object modeling apparatus that can suppress the generation of the distortion of a transfer image or the non-uniformity of the thickness of a transfer image in three dimensional object modeling by a transfer laminate system, a printing apparatus, a transferring method, a transferring pressing member, and a transfer body.

In a first aspect of the present invention, there is provided a three dimensional object modeling apparatus that produces a three dimensional object, the apparatus comprising: a forming unit configured to form an image to be transferred on an intermediate transfer body, the transfer image being to be transferred to a laminate product that is a three dimensional object being formed; a laminating unit configured to transfer the image to the laminate product by the use of the intermediate transfer body so as to laminate the image; and a pressing member configured to take pressing power to the image formed on the intermediate transfer body in a state of contacting with the laminate product from the intermediate transfer side for transferring the image to the laminate product, the pressing member including a plurality of high hardness portions having a high hardness and a plurality of low hardness portions having a hardness lower than that of the high hardness portions.

In a second aspect of the present invention, there is provided a printing apparatus that produces a printout, the apparatus comprising: a printing unit configured to print an image to be transferred on an intermediate transfer body, the image being to be transferred to a print medium; a transferring unit configured to transfer the image to the print medium by the use of the intermediate transfer body so as to print the image; and a pressing member configured to take pressing power to the image printed on the intermediate transfer body in a state of contacting with the print medium from the intermediate transfer side for transferring the image to the laminate product, the pressing member including a plurality of high hardness portions having a higher hardness and a plurality of low hardness portions having a hardness lower than that of the high hardness portions.

In a third aspect of the present invention, there is provided a three dimensional object modeling method of producing a three dimensional object, the method comprising: a forming step of forming an image to be transferred on an intermediate transfer body, the transfer image being to be transferred to a laminate product that is a three dimensional object being formed; a laminating step of transferring the image to the laminate product by the use of the intermediate transfer body so as to laminate the image; and a pressing step of taking pressing power to the image formed on the intermediate transfer body in a state of contacting with the laminate product from the intermediate transfer side for transferring the image to the laminate product, the pressing being performed with a plurality of high pressure portions and a plurality of lower pressure portions than the higher pressure portions.

In a fourth aspect of the present invention, there is provided a pressing member for taking pressing power to a transfer image formed on an intermediate transfer body in a state of contacting with a member so as to transfer the image on the member, the pressing member including a plurality of high hardness portions having a high hardness and a plurality of low hardness portions having a hardness lower than that of the high hardness portions.

The above-described configuration can suppress the generation of the distortion of a transfer image or the non-uniformity of the thickness of a transfer image in three dimensional object modeling by a transfer laminate system or the like.

Further features of the present invention will become apparent from the following description of exemplary embodiments (with reference to the attached drawings).

DESCRIPTION OF THE EMBODIMENTS

Embodiments of the present invention will be described below with reference to the attached drawings.

Figure 1:
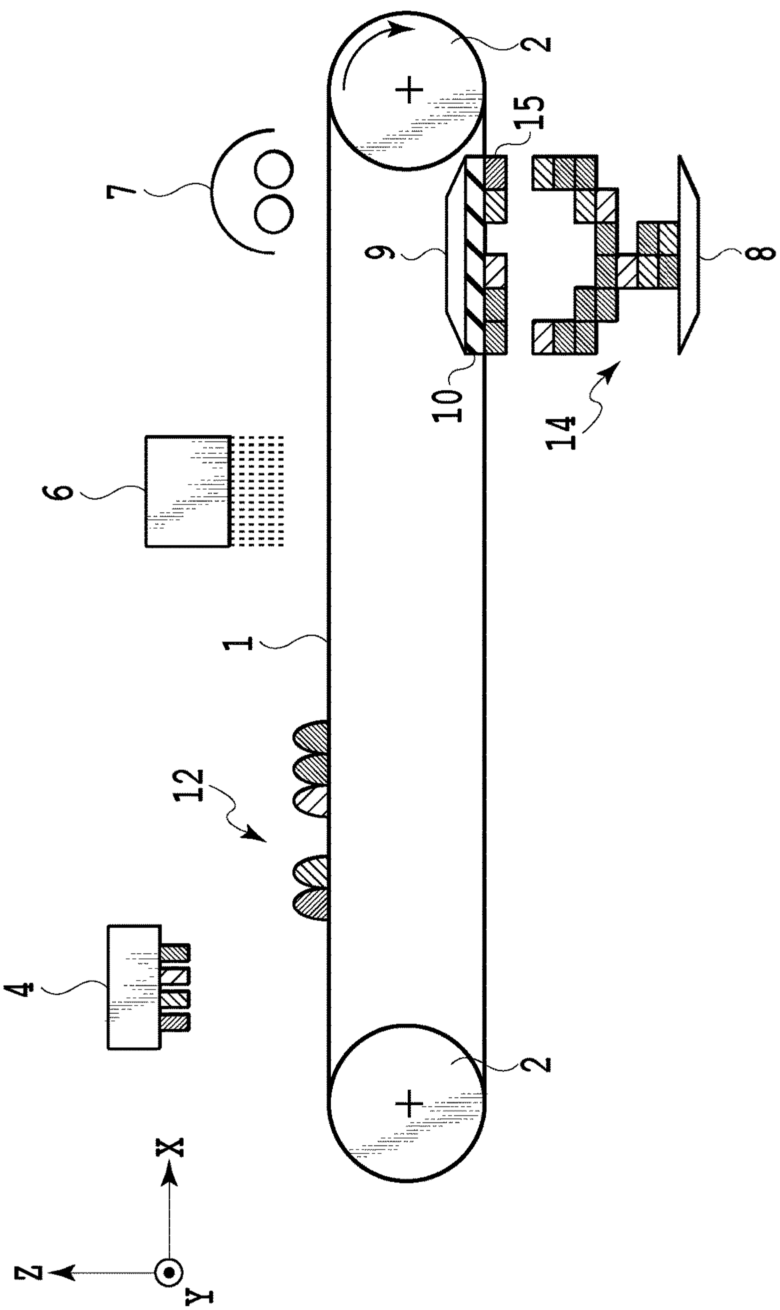
FIG. 1 is a side view schematically showing a three dimensional object modeling apparatus according to one embodiment of the present invention.

FIG. 1 is a side view schematically showing a three dimensional object modeling apparatus according to one embodiment of the present invention. A three dimensional object modeling apparatus in the present embodiment includes mainly a printing mechanism for forming (printing) an ink image as a transfer image on a belt-like intermediate transfer body (an obverse side of a belt) 1 and a transferring and laminating mechanism for transferring and laminating the ink image so as to form a three dimensional object.

In the printing mechanism, the belt-like intermediate transfer body 1 is disposed in such a manner as to be circumferentially rotated between two conveyance rollers 2. Drive force for rotation is transmitted to one of the conveyance rollers 2 so that the conveyance roller 2 is rotated so as to allow the intermediate transfer body 1 to travel (be moved). While the intermediate transfer body 1 on the upper side is moved in an X direction in FIG. 1, an inkjet apparatus 4 prints an ink image on the intermediate transfer body. The inkjet apparatus in the present embodiment is of a system in which bubbles are generated in ink with heat generated by a heater to be driven according to print data, and then, the ink is ejected by the pressure of the bubbles. It should be noted that the ejection system is not limited to this system, and other systems such as a piezoelectric system may be used. In addition, both of a serial scanning system and a line system may be used.

Next, a powder applicator 6 applies powder of a model material, which will be a frame for a three dimensional object, to the ink image. The ink image is patterned such that the model material at a non-image portion is removed from the ink image, to which the model material is applied, with the application of vibration or air. This patterning is achieved by the ink as an adhesive agent that allows patterning the ink image to retain the powder of the model material on the intermediate transfer body. Subsequently, a heating unit 7 melts the particles of the model material retained on the pattern of the ink image, thus forming a film. In this manner, a layer 15 of the ink image (the transfer image) for forming a three dimensional object is formed.

Thereafter, the layer 15 of the ink image in a melted state is transferred from the intermediate transfer body 1 to a laminating unit 8. Specifically, the layer 15 of the ink image is pressed in an opposite direction to a Z direction from the reverse side of the intermediate transfer body (an opposite side of the obverse of the belt) by a back plate 9 having a pressing member 10 thereon, and further, is brought into contact with the laminating unit 8 or a laminate product 14 laminated on the laminating unit 8. At this time, the laminating unit 8 is ascended in the Z direction, thus pressing the layer 15 of the ink image. In this manner, the layer 15 of the ink image is separated and joined, that is, transferred between the intermediate transfer body and an already laminated layer so as to form a part of the laminate product 14 that is a three dimensional object being formed, as described in detail later.

By repetitions of the above-described process, a desired laminate product (a three dimensional object) can be formed. Here, in FIG. 1, the ink image 12 and the structural body 14 that is being formed are shown by emphasizing the height for the sake of easy understanding.

Figure 2:
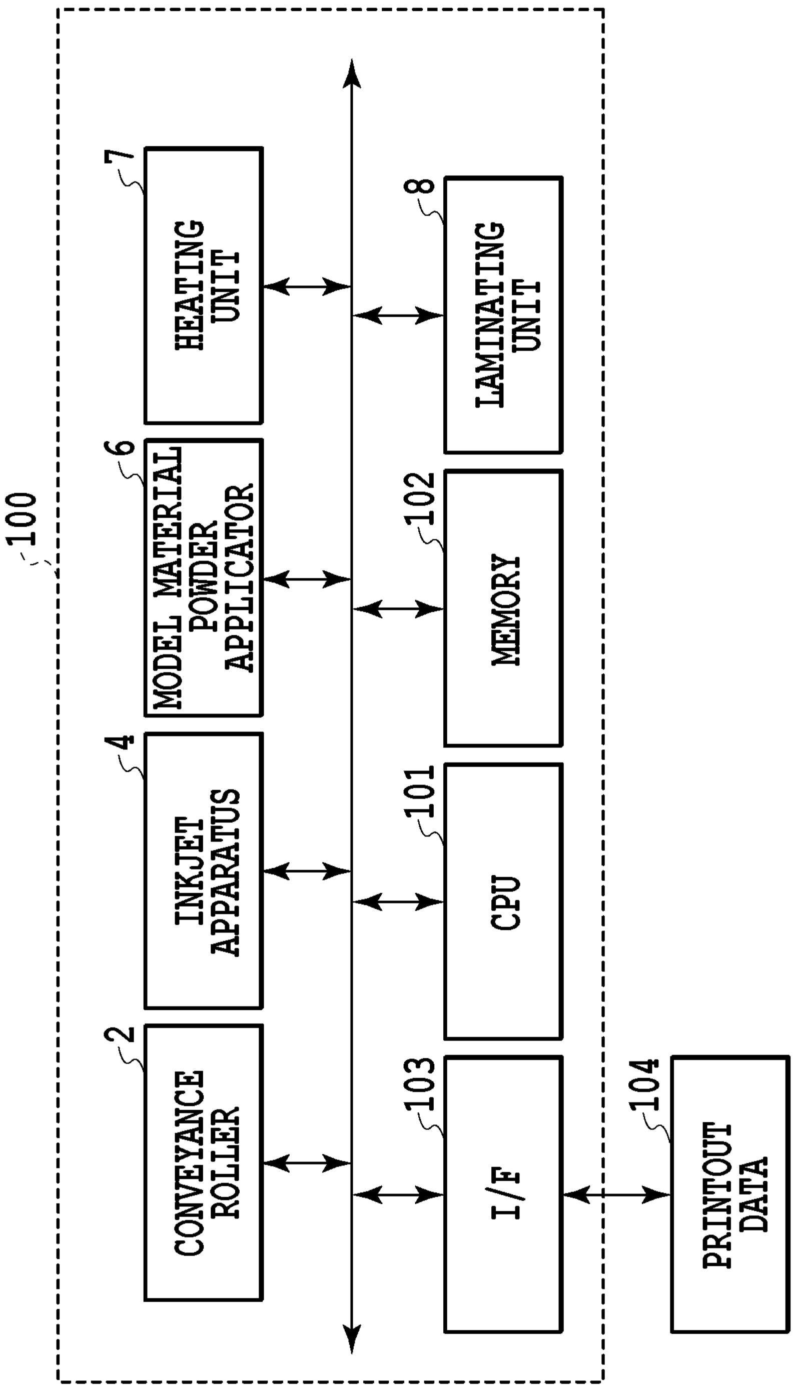
FIG. 2 is a block diagram illustrating mainly the control arrangement of the three dimensional object modeling apparatus shown in FIG. 1.

FIG. 2 is a block diagram illustrating mainly the control arrangement of a three dimensional object modeling apparatus 100 shown in FIG. 1. In FIG. 2, a CPU 101 constitutes a main control section for the entire control system in the apparatus, and controls the processing and operation of each of sections shown below. A memory 102 includes a ROM for storing therein a program for use in controlling by the CPU 101, a RAM for storing printout data 104 to be taken in via an interface 103 or forming a work area for use in data processing, and the like. Upon receipt of a print start signal, the CPU 101 performs communications so as to confirm the statuses of the conveyance rollers 2, the inkjet apparatus 4, the model material powder applicator 6, the heating unit 7, and the laminating unit 8 under a condition where print data is set. After the CPU 101 confirms the printable state in the above-described manner, the CPU 101 rotates the conveyance rollers 2 so as to convey the intermediate transfer body 1. At timing when the intermediate transfer body 1 is located while all of the sections are located at their set positions, the CPU 101 allows all of the sections to perform predetermined operations, thus printing and laminating the transfer image (a transfer pattern). The repetition of printing and laminating the transfer image enables a three dimensional object to be formed.

Figures 3A, 3B, 3C:
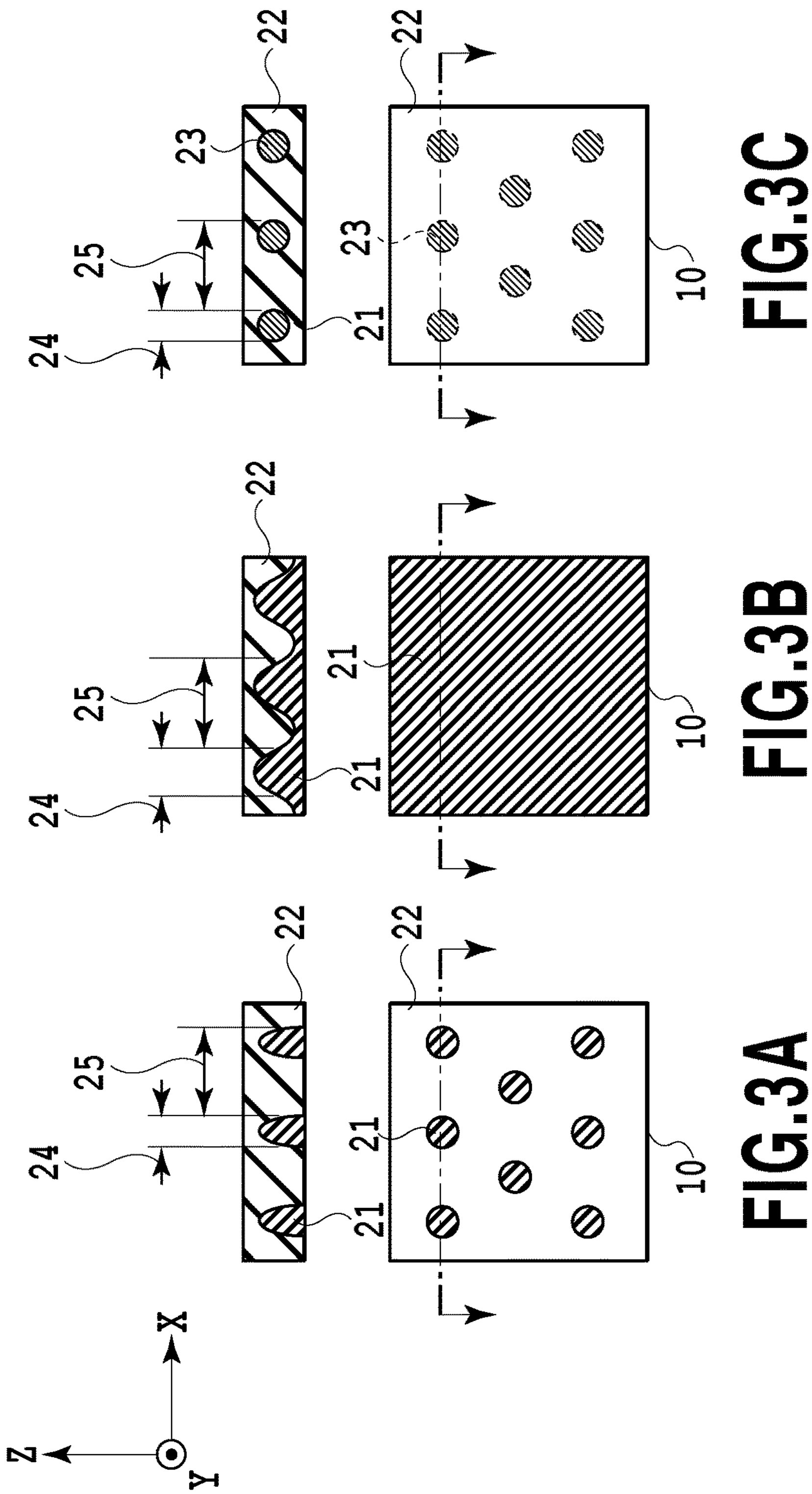
FIGS. 3A to 3C are views illustrating three examples of the configuration of a pressing member for pressing a transfer image via an intermediate transfer body according to one embodiment of the present invention.

FIGS. 3A to 3C show three examples of the configuration of the pressing member 10 according to one embodiment of the present invention. In each of the drawings, an upper figure shows a cross section taken along an alternate long and short dashed line in a lower figure. Moreover, the lower side of the pressing member 10 in the cross-sectional view (the upper figure in each of the drawings) is referred to as a pressing surface.

The pressing member 10 according to one embodiment of the present invention has a plurality of pressure points within the plane of the pressing member 10. The pressure point of the pressing member 10 is adapted to press the transfer layer 15 printed and formed on the transfer body 1 via the transfer body 1. Incidentally, although the pressure point may be arranged on the intermediate transfer body, the pressure point is formed on the pressing member 10, like the present embodiment, so that the pressure point may be formed only at a portion required for pressurizing and transferring (the pressing member 10 in FIG. 1). In a consequence, this configuration is preferable from the various viewpoints such as the simplicity of an apparatus configuration, the fabrication cost and conveyance stability of the intermediate transfer body, and the like. In particular, in the case of the use of a conveyance roller having a small radius, the thinner the thickness of the belt is, the more stable the conveyance becomes. In this case, the configuration shown in FIG. 1 is preferred. Moreover, in the case of the high planarity of the intermediate transfer body, an image is easily formed with a high accuracy. In view of this, it is much preferable that the pressure point should be made of different kinds of materials rather than by changing the shape of the material.

In the configuration of the pressure point shown in FIG. 3A, rubbers 21 having a higher hardness (high hardness portions) are disposed as dots, and further, their surroundings are filled with a rubber 22 having a lower hardness (a low hardness portion). In a configuration shown in FIG. 3B, a lower hardness rubber 22 is embedded at a convexo-concave surface of a higher hardness rubber sheet 21 having a regular unevenness to form a flattened surface. In a configuration shown in FIG. 3C, spherical solids 23 made of glass, ceramics, or metal are disposed regularly and embedded in an elastic body, thus forming an elastic sheet 22. It is more desirable that the shape of the material of the pressure point should be a sphere or a circular cone whose cross-sectional area is continuously varied in a pressurization direction. It should be understood that the configurations shown in FIGS. 3A to 3C are used upside down (FIGS. 4B and 4C).

Figures 4A, 4B, 4C, 4D, 4E:
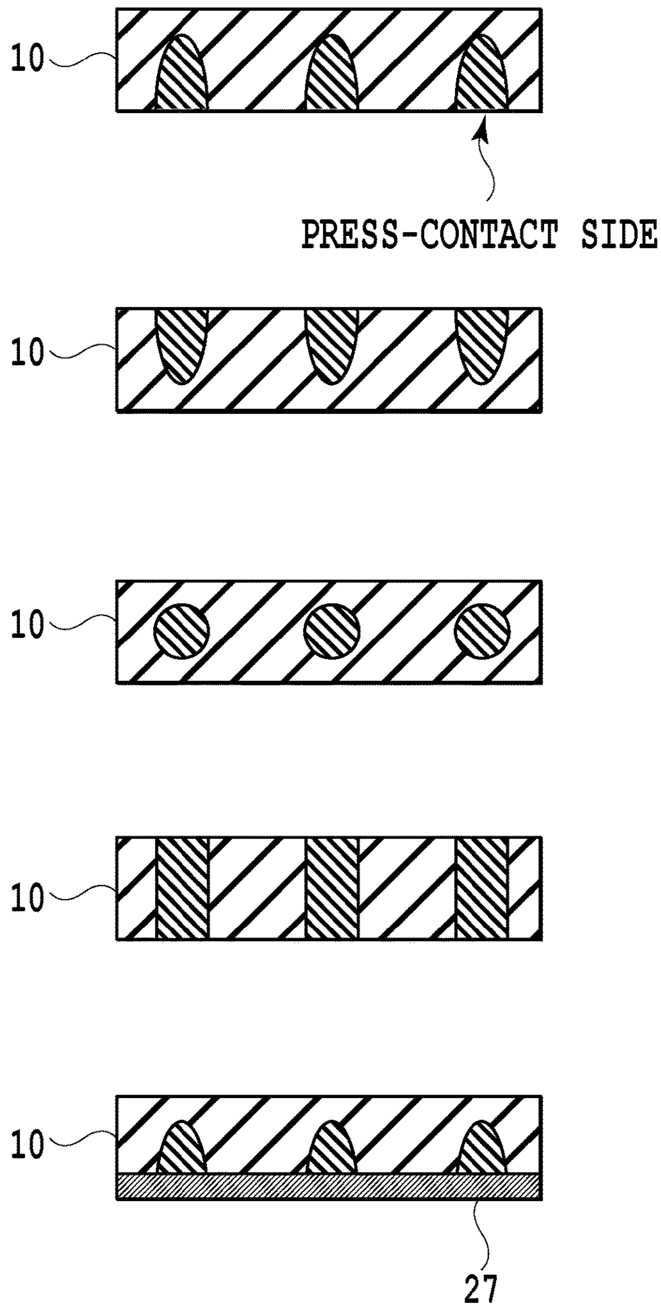
FIGS. 4A to 4E are views illustrating other examples of the configuration of the pressing member according to one embodiment of the present invention.

Other configurations may include a mode in which the pressure point may penetrate from the obverse to the reverse of the pressing member, as shown in FIG. 4D. A position of a deformation point with respect to a depth direction is a position nearer the transfer surface in which the deformation point mostly functions even under a low pressure. Several deformation points may be formed in the depth direction. FIG. 4E shows an example in which a surface layer 27 is formed on the pressing member 10 shown in FIG. 4A. In a case where the material of the surface layer 27 has the same expansion and contraction as those of the elastic body having a lower hardness at the pressing member, this configuration may be adopted.

In the example shown in FIG. 3A, the pressure point has an arrangement pattern in which circular points are scattered. However, the pattern is not limited to this. For example, striped or cross-lined arrangement pattern may be used. It is to be understood that the shape of each of the scattered patterns should not limited to the circle. Moreover, in the example shown in FIG. 3B, two kinds of materials set the pressure point. However, three or more of materials may be used. Furthermore, in a case where two or more kinds of constituent materials are elastic, the pressure point need not be circular. Although each of the above-described different kinds of materials may be exposed to the surface of the intermediate transfer body, one kind of surface material is much preferred in order to make ink adhesiveness uniform. In addition, like the example shown in FIG. 3C, a second material may be embedded in a first material, and further, a surface layer may be made of a material having a good affinity with ink to be used.

Incidentally, in other modes, the pressure point described above with reference to FIGS. 3A to 3C may be formed on a part of the intermediate transfer body. Moreover, in, for example, the three dimensional object modeling apparatus shown in FIG. 1, the pressing member 10 may be integrated with the intermediate transfer body 1. The pattern of the pressure point incorporated in the intermediate transfer body is controlled in such a manner as to be moved to a position facing a surface to be transferred with the transfer layer held therebetween while transferring.

(Arrangement or the Like of Pressure Points)

The arrangement of the pressure points in a plane need not be strictly regular as long as there is no large eccentric distribution. This is because the shape of the pressing member 10 may have just a smooth plane without any pressurization (during image printing and transfer layer releasing). Specifically, the smooth plane during the image printing enables image formation with a high accuracy, and further, the pressing member 10 returns to the smooth plane during the transfer image releasing, thus achieving the surface smoothness of the transfer image.

Elements for determining the arrangement of the pressure points include the pitch and size of the points. As shown in FIGS. 3A to 3C, the size of the pressure point may be equal to the size of each of materials, each having a smallest deformation, in the constituent materials. In particular, in the example shown in FIG. 3A, the size 24 of the pressure point is equal to the (maximum) size of the hard rubber 21; and in the example shown in FIG. 3C, it is equal to the size of the solid 23. Moreover, in the example shown in FIG. 3B, it is equal to the size of a projection defined by the hard rubber 21. The pitch of the pressure points signifies a pitch 25 between the pressure points.

The size of the pressure point is determined with reference to a minimum area of an image to be printed, for example, with reference to the size of one ink dot. The size of the pressure point depends on the characteristics of the ink for use in image printing, and therefore, an optimum design under each condition is desirable. For example, a half or more of one dot size is desirable. Since the size of one dot in a general inkjet printing apparatus is, for example, 40 μm in diameter, it is preferable that the size of the pressure point should be 20 μm or more. As an indication of an upper limit, the size of the pressure point is four times a minimum area in the case of a non-elastic member: in contrast, it is hardly restricted in the case of an elastic member, that is, the size of the pressure point is about 400 times a minimum area. Specifically, in a case where one dot size is 40 μm, it is 160 μm in the case of a non-elastic member whereas 16 mm in the case of an elastic member.

The optimum value of the pitch of the pressure point depends on the material forming the pressing member or the intermediate transfer body. For example, the minimum pitch is equal to the point size: in contrast, the maximum pitch is equal to about 400 times the minimum area or 150 times the point size.

It is desirable that the hardness of the material forming the pressure point should be optimized according to the thickness of the transfer layer such as the ink, the roughness of a non-transfer surface, or a required accuracy. In the present embodiment, a difference in hardness is set to 10° or more, more preferably, 15° or more within a rubber hardness range of 20° to 90°. The difference in hardness may be provided by post-processing of the pressing member. For example, a rubber material is irradiated with ultraviolet light via a predetermined pattern mask, thus selectively increasing the hardness of an irradiated portion.

Figure 5:
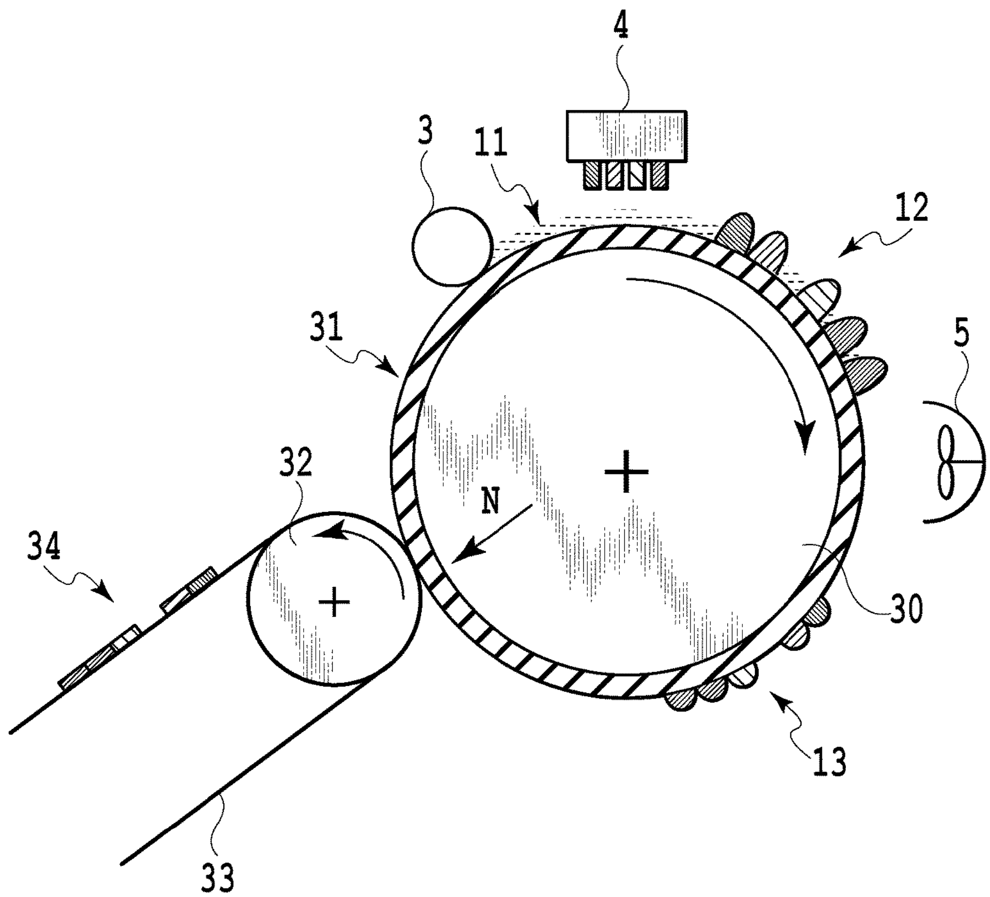
FIG. 5 is a view showing a printing apparatus for transferring an image formed by an inkjet system so as to form an image according to one embodiment of the present invention.

FIG. 5 is a view showing a printing apparatus for transferring an image formed by an inkjet system so as to form an image according to another embodiment of the present invention. In FIG. 5, upon start of printing, first, a reaction liquid 11 is applied onto an intermediate transfer body 31 formed on an image forming drum 30 by a reaction liquid applicator 3, and then, an inkjet apparatus 4 prints an ink image 12 on the intermediate transfer body 31. And then, a water removing unit 5 condenses the ink in the ink image, thus obtaining an ink image 13. A printing apparatus in the present embodiment transfers the ink image 13 formed on the intermediate transfer body 31 to a print medium 33 by pressing the ink image 13 in a N direction so as to come in contact with the print medium 33. This transfer makes the print medium have a printout 34 thereon.

In the above-described configuration, the plurality of pressure points are formed on the intermediate transfer body 31. Here, the intermediate transfer body may be disposed on a side of a sheet feed roller 32 in the apparatus having the configuration shown in FIG. 5.

According to the present invention, the plurality of pressure points are formed on the intermediate transfer body or the pressing member in the three dimensional object modeling apparatus and the printing apparatus according to the above-described embodiments. In this manner, it is possible to overcome the drawbacks of the generation of the distortion of an image per se due to the elongation of the transfer image or the non-uniformity of the thickness of the transfer image caused by only one point to press and deform in the related art, as described above.

According to the embodiments according to the present invention, the plurality of pressure points are formed so that rubbing amount can be dispersed, resulting in enhancing transfer efficiency without inducing degradation of transfer pattern accuracy such as image distortion.

As the simplest system, non-uniformity of pressure amount is intentionally produced in a tangential direction of the roller in pressurizing with the roller shown in FIG. 5, thus effectively generating a rubbing. Specifically, a rubbing generated by one large deformation in the related art is generated by a plurality of small deformations.

Like the apparatus shown in FIG. 1, the embodiment shown in FIG. 5 is applicable to not only linear pressurization but also a planar pressurization, thus effectively suppressing image distortion. For example, pad printing in two-dimensional printing that has been conventionally known is of a planar transfer system using a print pad made of silicone rubber. Here, the print pad for use is formed into a raised shape toward the center from the circumference, and it has only one pressure generation point. Although the shape of the pressure point in the present embodiment may be desirably designed, it is preferable that it should be formed by arranging the plurality of materials having different deformations, as described above. This is because in a case where, for example, the inkjet system forms on an intermediate transfer body a transfer pattern to be transferred, an inkjet head can eject ink nearer to the intermediate transfer body as the intermediate transfer body is flatter, and therefore, landing accuracy can be enhanced.

Furthermore, the surface area of the intermediate transfer body and the surface area of a print surface can be made equal to each other during pattern formation, thus easily controlling the thickness of the ink on the transfer image. The uniform thickness of the ink can increase the colorant density of a printout or improve lamination accuracy in shaping a laminate product. Furthermore, the surface layer of the intermediate transfer body and the pressing member are configured independently of each other, and then, the plurality of pressure points are formed on the pressing member, thus achieving the sheet-like surface layer.

In the transfer mechanism in the present embodiment utilizing the pressurization at the pressure point and the deformation accordingly, even the transfer layer having a hardness higher than that of the intermediate transfer body or even the transfer layer having a lower hardness can enhance the transfer efficiency.

Figures 6A, 6B:
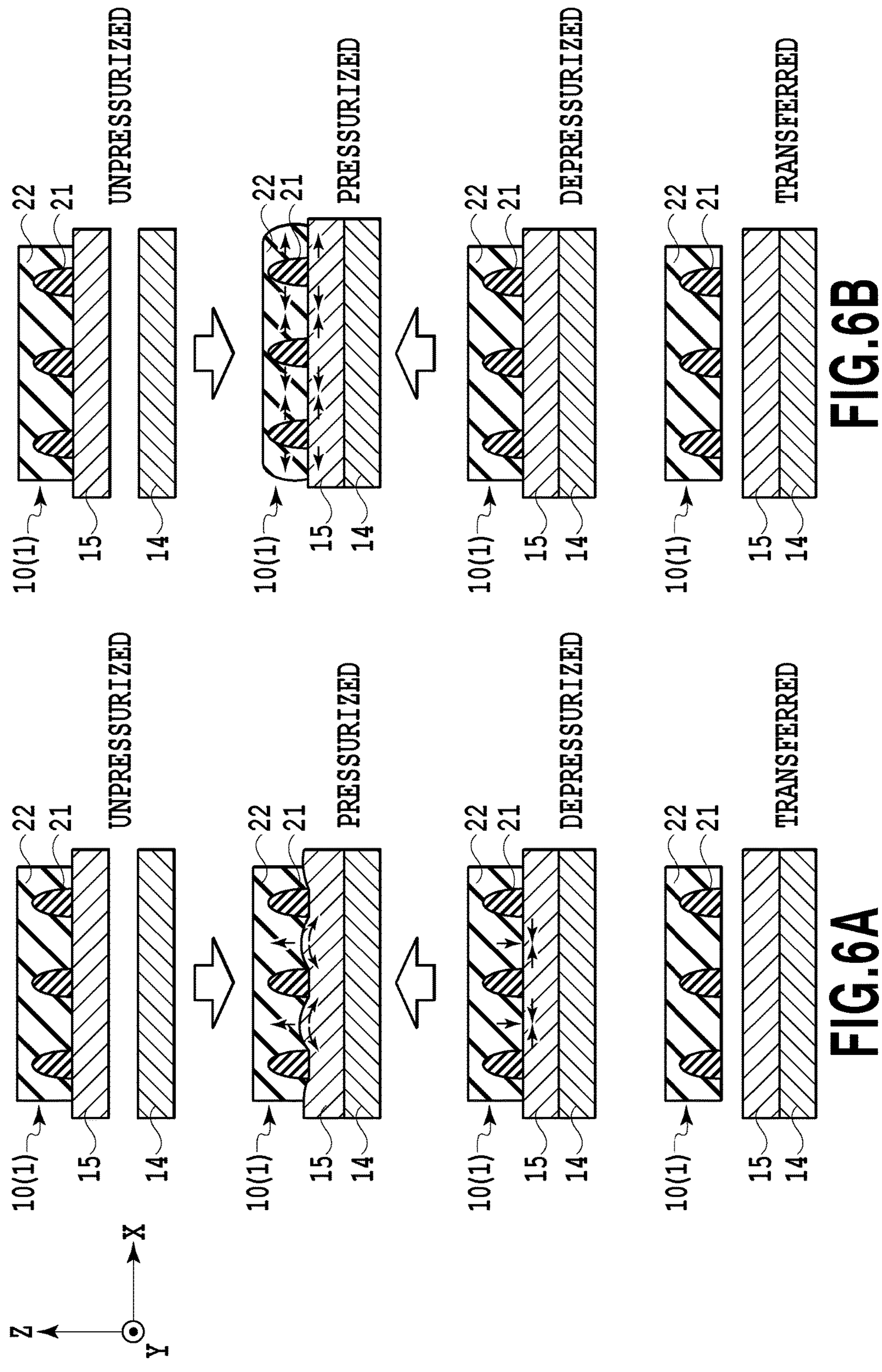
FIGS. 6A and 6B are views illustrating functions assumed by arranging a plurality of pressure points according to the above-described embodiment of the present invention.

FIGS. 6A and 6B are views illustrating presumed functions by arranging a plurality of pressure points according to the above-described embodiment of the present invention, and specifically illustrate unpressurized (pre-pressurized), pressurized, depressurized, and transferring (separating) statuses. FIGS. 6A and 6B also illustrate a process in the laminating unit 8 in which by the pressing member 10 (the intermediate transfer body 1) is used to transfer (move) the transfer layer (the image) 15 formed on the intermediate transfer body 1 shown in FIG. 1 from the intermediate transfer body 1 to the structural member 14 that is being formed. In the apparatus shown in FIG. 1, during the transferring operation, the laminating unit is moved upward (FIG. 1), and thus, the transfer layer 15 formed on the intermediate transfer body 1 abuts on the upper surface of the structural member 14 that is being formed. At this time, the laminating unit is moved in a Z direction, and applies force in a direction substantially perpendicular to the surface of the intermediate transfer body to the laminate product 14 and the layer 15 of the ink image on the intermediate transfer body. With this abutment pressure, a difference in deformation between the higher hardness portion and the lower hardness portion occurs inside of the pressing member 10 mounted on the back plate 9, thereby generating pressurization at all of the plurality of pressure points designed and arranged on the pressing member. In FIGS. 6A and 6B, the intermediate transfer body 1 should be actually interposed between the pressing member 10 and the transfer layer 15, but its illustration is omitted. Alternatively, like the above-described embodiment, with the configuration in which the plurality of pressure points are formed directly on the intermediate transfer body 1, the pressing member 10 in FIGS. 6A and 6B may be regarded as the intermediate transfer body 1.

The function shown in FIG. 6A is caused by the periodic fluctuation of the surface area of the pressing member 10 (therefore of the intermediate transfer body 1), the fluctuation being assumed to be produced by the pressurization of the pressing member 10 having the plurality of pressure points arranged thereon to the transfer layer 15, as described above. That is, the periodic fluctuation of the surface area causes separation force on the boundary between the transfer layer 15 and the intermediate transfer body 1.

In FIG. 6A, before the pressure is applied (at the time of no pressurization), the uppermost layer of the structural member 14 retained by the laminating unit 8 is out of contact with the transfer layer 15. As the laminating unit 8 is ascended in the Z direction, the uppermost layer of the structural member 14 that is being formed is brought into contact with the lower surface of the transfer layer 15, and thereafter, the pressing member 10 (relatively) presses the transfer layer 15 in a direction opposite to the Z direction. In this state, since the deformation of the soft elastic body 22 is greater than that of the hard elastic body 21 forming the pressure point, the soft elastic body 22 produces stress on the transfer layer 15 in contact therewith in a direction in which the transfer layer 15 extends (an extension direction). And then, in the state in which the laminating unit 8 is descended so as to release the pressurization, the elastic body 22 having a larger deformation is restored to its original state, and therefore, a compressive stress is produced on the transfer layer 15 in contact with the elastic body 22. In this manner, force acting in a direction along the intermediate transfer body 1 (a direction along an XY plane), different from a direction of the pressurization (the Z direction) positively acts on the ink image 15. It is assumed that non-uniform deformation such as the extension and compression, as described above, is applied onto the transfer layer 15 at a predetermined period so that shear force is produced on the boundary between the intermediate transfer body and the transfer layer. Specifically, the plurality of pressure points 21 that are periodically arranged allows a non-uniform change in deformation on the transfer layer to be produced. For example, a portion of the soft elastic body 22 in the proximity of the hard elastic body 21 of the intermediate transfer body is restrictively deformed whereas the soft elastic body 22 remoter from the hard elastic body 21 is inherently deformed. Such non-uniform deformation causes the non-uniform deformation over the entire transfer layer, thus effectively producing the shear force between the intermediate transfer body and the transfer layer so as to efficiently separate the transfer layer from the intermediate transfer body.

In FIG. 6A, the transfer layer 15 separated from the intermediate transfer body 1 by the above-assumed function is transferred onto the uppermost layer of the structural body 14 that is being formed, followed by integration, and thus transferred layer 15 prepares for receiving a next transfer layer 15.

Incidentally, three different deformations caused with respect to the pressurization inclusive of the deformation of the transfer layer occur on the boundary between the intermediate transfer body and the transfer layer. Even if the deformation of the transfer layer becomes identical to that of either one of the two kinds of elastic bodies of the intermediate transfer body, the shear force can be produced because the intermediate transfer body is made of a composite material including the two kinds or more of materials.

On the other hand, the function illustrated in FIG. 6B is a function in which the hard elastic bodies 21 of the pressing layer 10 (the intermediate transfer body 1) move non-uniformly during the pressurization. In the pressurized state, the positional relationship between the hard elastic body 21 having a small deformation and the soft elastic body 22 having a large deformation, that is, high movability slightly changes. Also in this function, the force acting in the direction along the intermediate transfer body 1 (the direction along the XY plane), different from the direction of the pressurization (the Z direction) positively acts on the ink image 15. As a result, since a non-uniform rubbing stress is produced on the boundary between the transfer layer and the intermediate transfer body, it is assumed that the separation between the transfer layer and the intermediate transfer body is promoted. It should be understood that this function can be enhanced with the application of vibrations by the use of means such as an ultrasonic generator, thus increasing transferability.

It is obvious from the above descriptions that the functions described above with reference to FIGS. 6A and 6B become more increased in a case where, in particular, the pressure points are arranged at a small pitch, that is, the plurality of pressure points strongly interact with each other.

It should be understood that the pressure points need not always be arranged at a regular pitch. They may be arbitrarily arranged as long as the above-described plurality of pressure points interact with each other so as to produce the rubbing stress at a plurality of portions.

(Material of Intermediate Transfer Body and the Like)

Specific materials of the above-described intermediate transfer body include various kinds of rubber and elastomer materials: for example, natural rubber, isoprene rubber, butadiene rubber, styrene butadiene rubber, butyl rubber, nitrile rubber, ethylene propylene rubber, chloroprene rubber, acrylic rubber, chlorosulfonated polyethylene rubber, urethane rubber, silicone rubber, fluorine rubber, polysulfide rubber, a polystyrene-based elastomer, a polyolefin-based elastomer, a vinyl chloride-based elastomer, a polyurethane-based elastomer, a polyester-based elastomer, a polyamide-based elastomer, and a polybutadiene-based elastomer.

As for the above-described deformation under predetermined pressure according to the embodiment of the present invention, rubbers of the same base whose properties are changed by a filler, a molecular weight, an additive agent, or the like may be expressed in the category of the different kinds of materials. Particularly, silicone rubber (a silicone compound) or fluorine rubber (a fluorine compound) has a high separability, and therefore, it is suitable for a surface material. Moreover, the rubber hardness or deformation of the silicone rubber is easily adjusted and its properties are stable, and therefore, it is suitable for a surface material. Silicone rubber or fluorine rubber is suitable for the surface material of the intermediate transfer body in a case where the surface layer of the intermediate transfer body and the layer of the pressing member are used in combination.

The ink image is formed on the above-described intermediate transfer body.

Ink used for image printing is selected in consideration of the characteristics of a reaction liquid to be used. Particularly, water-based inks that can utilize an ionic reaction that is quick is suitable. Among the water-based inks, a pigment ink whose colorant cannot be ionized has a good affinity with a metal salt reaction liquid, and therefore, it is very preferably used in the system according to the present invention.

The physical properties of the pigment ink can be adjusted by adding a dispersion resin, a dispersion additive agent, a water soluble organic solvent, a pH adjusting agent, a surfactant, water, or the like in addition of a pigment serving as a colorant. The blend ratio of the materials should be desirably determined according to an image to be printed or a reaction liquid to be used. As a guideline, the pigment ink includes 1% to 10% of a pigment, 5% to 30% of a water soluble organic solvent, 70% to 90% of water, and several percent or less of other materials.

A description will be given below of specific examples according to the embodiment of the present invention.

Example 1

Example 1 relates to fabrication of a three dimensional object by the apparatus shown in FIG. 1.

As the surface layer of the intermediate transfer body, a 0.05 mm PET film is coated with a silicone rubber having a rubber hardness of 40° (KE42 manufactured by Shin-Etsu Chemical Co., Ltd.) in a thickness of 0.2 mm, followed by hardening the silicone rubber, and then, the surface is hydrophilized by a parallel plate type atmospheric plasma device (ATP203 manufactured by SEKISUI CHEMICAL CO., LTD.).

Next, the inkjet apparatus (a nozzle density: 1200 dpi; ejected droplets amount: 4 pl; and a drive frequency: 10 khz) forms an ink image according to a design image corresponding to slice data on a three dimensional object to be created on the intermediate transfer body (maximum ink application amount: 400%). Inks used herein are shown below (four colors). At that time, a dot size is about 40 μm.

<Ink Formulation>

Pigment: 4 parts by weight

Black: carbon black

Cyan: pigment blue 15

Magenta: pigment red 7

Yellow: pigment yellow 74

Resin: 2 parts by weight of styrene-acrylic acid ethyl copolymer (oxidation: 220; and average molecular weight: 5000)

Ethylene glycol: 4 parts by weight

Ethylene alcohol: 4 parts by weight

Surfactant: 1 part by weight of Acetylenol EH (manufactured by Kawaken Fine Chemicals Co., Ltd.)

Pure water: 85 parts by weight

Subsequently, the model material powder applicator applies polypropylene resin powder (having an average particle size of 70 micron) over the entire ink image, and then, a destaticizing air blow removes the resin powder adhering to a non-image portion (since the ink acted as an adhesive agent, the resin powder remains at only an ink adhering portion).

Thereafter, the heating unit heats the transfer body up to about 180° C., followed by dissolving the resin powder and forming a film.

And then, the laminating unit brought the structural body that is being formed into press-contact with a pattern that is dissolved and formed into a film, followed by cooling.

Subsequently, the back plate having the pressing member mounted thereon is instantaneously pressurized at a load of 1.5 kg/cm$^2$, and is released at once.

<Pressing Member>

Hard elastomer (elastic body): styrene-based elastomer having a hardness of 60°

Soft elastomer (elastic body): styrene-based elastomer having a hardness of 40°

Point size: 60 μm

Point pitch: 5 mm

Thickness of pressing member: 2 mm

Finally, the laminating unit is descended, and thus, all of the materials are completely transferred in the state in which no pattern film remained on the intermediate transfer body. The transferred pattern film surface had high smoothness. The layers are laminated in the above-described manner, and consequently, a colored three dimensional object is completed with high accuracy. The resultant three dimensional object is left in an ambience of 40° C. for 72 hours, resulting in no marked distortion.

Comparative Example 1

The pressing member used in Example 1 is replaced with a pressing member formed of a single elastic body. The other materials and processes are the same as those in Example 1.

<Pressing Member>

Hard elastomer (elastic body): styrene-based elastomer having a hardness of 60°

Soft elastomer (elastic body): None

Point size: None

Point pitch: None

Thickness of pressing member: 2 mm

The laminating unit is descended, and thus, all of the materials are completely transferred in the state in which no pattern film remains on the intermediate transfer body. Here, it is observed that several portions are warped toward the transfer body at a transferred pattern film edge. After the layers are laminated, a resultant three dimensional object has poor accuracy with laminate deviation or adhesion failures at several portions.

Comparative Example 2

A laminate is fabricated in the same manner except that the pressing member is pressurized at 4 kg/cm$^2$ in Comparative Example 1. Unlike Comparative Example 1, no warpage is observed at the transferred pattern film edge after the laminating unit is descended. The layers are laminated, and thus, a three dimensional object is created. The resultant three dimensional object shows slightly poor accuracy. A distortion of about 5% at the maximum is observed in comparison with Example 1. The resultant three dimensional object is left in an ambience of 40° C. for 72 hours, and thus, the distortion became worse.

Example 2

Example 2 relates to printing by the printing apparatus shown in FIG. 5.

An intermediate transfer body, as shown below, whose surface is hydrophilized by a parallel plate type atmospheric plasma device (ATP203 manufactured by SEKISUI CHEMICAL CO., LTD.) is used as the intermediate transfer body.

<Transfer Body (Integral Type of Surface Layer with Pressing Member)>

Hard elastomer (elastic body): styrene-based elastomer having a hardness of 80°

Soft elastomer (elastic body): styrene-based elastomer having a hardness of 70°

Point size: 60 μm

Point pitch: 3 mm

Thickness of pressing member: 1.75 mm

Material of surface layer: silicone rubber having a hardness of 40° (KE42 manufactured by Shin-Etsu Chemical Co., Ltd.)

Thickness of surface layer: 0.2 mm

The entire intermediate transfer body is coated with a reaction liquid in a thickness of 0.2 μm by using a roll coat type applicator. The reaction liquid used is shown below.

<Reaction Liquid Formulation>

$CaCl_2/2H_2O$: 10 parts by weight

AES-based commercially available surfactant: 1 part by weight

Diethylene glycol: 20 parts by weight

Pure water: 69 parts by weight

Next, a color image (a maximum ink application quantity: 400%) is formed on the intermediate transfer body coated with the reaction liquid by the inkjet apparatus (a nozzle density: 1200 dpi; an ejected droplet quantity: 4 pl; and a drive frequency: 10 khz). The inks that are used are shown below (four colors). At that time, a dot size is about 40 μm.

<Ink Formulation>

Pigment: 4 parts by weight

Black: carbon black

Cyan: pigment blue 15

Magenta: pigment red 7

Yellow: pigment yellow 74

Resin: 2 parts by weight of styrene-acrylic acid ethyl copolymer (oxidation: 220; and average molecular weight: 5000)

Ethylene glycol: 4 parts by weight

Ethylene alcohol: 4 parts by weight

Surfactant: 1 part by weight of Acetylenol EH (manufactured by Kawaken Fine Chemicals Co., Ltd.)

Pure water: 85 parts by weight

Subsequently, the ink image formed on the intermediate transfer body is irradiated with hot air at 65° C. for 20 seconds. Thereafter, a print medium (64 g of Aurora Coated Sheet manufactured by Nippon Paper Industries, Co., Ltd.) is pressed against the ink image in contact under a load of 4 kg/cm$^2$ by using sheet feed rollers, followed by transferring the image. In this manner, the entire ink image formed on the intermediate transfer body is transferred, thus obtaining a printout of a high quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-137900, filed Jul. 3, 2014, which is hereby incorporated by reference herein in its entirety.

What is claimed is:

1. A three dimensional object modeling apparatus that produces a three dimensional object, the apparatus comprising:

a forming unit configured to form a transfer image to be transferred on an intermediate transfer body, with the transfer image to be transferred to a laminate product that is a three dimensional object being formed;

a laminating unit configured to transfer the transfer image to the laminate product from the intermediate transfer body; and a pressing member provided with the intermediate transfer body and configured to take pressing power to the transfer image formed on the intermediate transfer body, in a state of contacting with the laminate product from the intermediate transfer body side for transferring the transfer image to the laminate product, the pressing member including a plurality of high hardness portions having a high hardness and a low hardness portion having a hardness lower than that of the high hardness portions, wherein, in a cross section of the pressing member along a surface of the intermediate transfer body, the plurality of high hardness portions are disposed such that (i) the plurality of high hardness portions are separated from each other and (ii) each high hardness portion is surrounded by the low hardness portion.

2. The three dimensional object modeling apparatus according to claim 1, wherein the pressing member is provided at an opposite side of the intermediate transfer body.

3. The three dimensional object modeling apparatus according to claim 1, wherein the pressing member is configured by periodically arranging combinations of the plurality of high hardness portions and the low hardness portion.

4. The three dimensional object modeling apparatus according to claim 1, wherein the plurality of high hardness portions and the low hardness portion of the pressing member are made of two or more materials having a different hardness.

5. The three dimensional object modeling apparatus according to claim 4, wherein the two or more materials having a different hardness are elastic bodies, with a difference in hardness between the elastic body having a highest hardness and the elastic body having a lowest hardness being 10° or more.

6. The three dimensional object modeling apparatus according to claim 1, wherein at least a surface of the intermediate transfer body, on which the transfer image is formed, includes a silicone compound or a fluorine compound.

7. The three dimensional object modeling apparatus according to claim 1, wherein the forming unit prints the transfer image on the intermediate transfer body by an inkjet apparatus so as to form the transfer image.

8. A printing apparatus that produces a printout, the apparatus comprising:

a printing unit configured to print a transfer image to be transferred on an intermediate transfer body, with the transfer image to be transferred to a print medium;

a transferring unit configured to transfer the transfer image to the print medium from the intermediate transfer body; and a pressing member provided with the intermediate transfer body and configured to take pressing power to the transfer image printed on the intermediate transfer body, in a state of contacting with the print medium from the intermediate transfer body side for transferring the transfer image to the print medium, the pressing member including a plurality of high hardness portions having a higher hardness and a low hardness portion having a hardness lower than that of the high hardness portions, wherein, in a cross section of the pressing member along a surface of the intermediate transfer body, the plurality of high hardness portions are disposed such that (i) the plurality of high hardness portions are separated from each other and (ii) each high hardness portion is surrounded by the low hardness portion.

* * * * *